US009169437B2

(12) United States Patent
Cordonier et al.

(10) Patent No.: US 9,169,437 B2
(45) Date of Patent: Oct. 27, 2015

(54) SELECTIVE ETCHING METHOD

(75) Inventors: Christopher Cordonier, Kanagawa (JP); Mitsuhiro Nabeshima, Kanagawa (JP); Shingo Kumagai, Kanagawa (JP); Naoki Takahashi, Kanagawa (JP)

(73) Assignee: JCU CORPORATION, Tokyo (JP)

( * ) Notice: Subject to any disclaimer, the term of this patent is extended or adjusted under 35 U.S.C. 154(b) by 0 days.

(21) Appl. No.: 14/385,007

(22) PCT Filed: Sep. 3, 2012

(86) PCT No.: PCT/JP2012/072301
§ 371 (c)(1),
(2), (4) Date: Sep. 12, 2014

(87) PCT Pub. No.: WO2013/136555
PCT Pub. Date: Sep. 19, 2013

(65) Prior Publication Data
US 2015/0048053 A1    Feb. 19, 2015

(30) Foreign Application Priority Data

Mar. 12, 2012 (WO) .................. PCT/JP2012/056315

(51) Int. Cl.
C09K 13/00 (2006.01)
C09K 13/02 (2006.01)
C23F 1/38 (2006.01)
C23F 1/40 (2006.01)
C23F 1/36 (2006.01)
C23F 1/44 (2006.01)
C03C 15/00 (2006.01)

(52) U.S. Cl.
CPC ................. *C09K 13/02* (2013.01); *C03C 15/00* (2013.01); *C23F 1/36* (2013.01); *C23F 1/38* (2013.01); *C23F 1/40* (2013.01); *C23F 1/44* (2013.01)

(58) Field of Classification Search
USPC .................................... 216/97; 252/79.1, 79.5
See application file for complete search history.

(56) References Cited

U.S. PATENT DOCUMENTS

| 4,554,050 A | 11/1985 | Minford et al. |
| 2006/0226122 A1 | 10/2006 | Wojtczak et al. |
| 2011/0230053 A1 | 9/2011 | Matsuda et al. |

FOREIGN PATENT DOCUMENTS

| JP | 2008-536312 | 9/2008 |
| JP | 2010-165732 | 7/2010 |
| WO | WO 2006/110279 A1 | 10/2006 |
| WO | WO 2009/081884 A1 | 7/2009 |

OTHER PUBLICATIONS

International Search Report issued Oct. 23, 2012, in PCT/JP12/072301 filed Sep. 3, 2012.
International Preliminary Report on Patentability and Written Opinion issued Sep. 25, 2014 in PCT/JP2012/072301 filed Sep. 3, 2012(with English translation).

*Primary Examiner* — Roberts Culbert
(74) *Attorney, Agent, or Firm* — Oblon, McClelland, Maier & Neustadt, L.L.P.

(57) ABSTRACT

A layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, the layer being provided on an underlying base material selected from glass, silicon, copper and nickel, is selectively etched with an alkaline etching solution containing a predefined complexing agent.

8 Claims, 2 Drawing Sheets (A) Ra = 2.86 nm (B) Ra = 3.57 nm (C) Ra = 2.95 nm (D) Ra = 3.10 nm (A) Surface of Si wafer     (B) Surface of TaN film     (C) Surface of etched Si wafer (A) Surface of Si wafer     (B) Surface of TiO$_2$ film     (C) Surface of etched Si wafer

SELECTIVE ETCHING METHOD

TECHNICAL FIELD

The present invention relates to a method for selectively etching a layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, the layer being provided on an underlying base material selected from glass, silicon, copper and nickel, in preference to the underlying base material.

BACKGROUND ART

In general, when etching of titanium is carried out, a hydrofluoric acid-based etching solution is used. However, when such a hydrofluoric acid-based etching solution is used, the underlying base material will also be etched in cases where the underlying base material is nickel or glass.

Furthermore, when etching of titanium is carried out, a sodium hydroxide solution may be used. However, titanium will hardly be etched with such an etching solution alone, and the etching rate is very slow even when hydrogen peroxide is combined with the etching solution to improve the etching rate. Therefore, this etching solution is impracticable.

In recent years, as for etching solutions for titanium, a method in which EDTA is used as a complexing agent has been known, and, specifically, a method in which an alkaline etching solution containing EDTA and hydrogen peroxide is used has been known (Patent Document 1).

However, while titanium deposited on lithium niobate ($LiNbO_3$) can be selectively etched by this method, there is a problem of slow etching rate. Furthermore, in this method, some substances (metals) cannot be etched, and the underlying base material may be adversely affected depending on the type of the underlying base material. For example, since the etching rate of titanium is slower than the etching rate of nickel, the underlying base material is dissolved prior to dissolution of titanium.

PRIOR ART DOCUMENT

Patent Document

Patent Document 1: U.S. Pat. No. 4,554,050

SUMMARY OF THE INVENTION

Problems that the Invention is to Solve

An objective of the present invention is to provide a method for selectively etching not only titanium but also other metals at practical speed in preference to the underlying base material.

Means for Solving the Problems

The present inventors conducted intensive studies to solve the above-described problem. Consequently, the present inventors found that an alkaline etching solution containing a specific complexing agent can selectively etch a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, in preference to the underlying base material selected from glass, silicon, copper and nickel, and the present inventors completed the present invention.

Specifically, the present invention relates to an etching method, including: bringing a layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, the layer being provided on an underlying base material selected from glass, silicon, copper and nickel, into contact with an etching solution which consists essentially of at least one complexing agent selected from compounds shown by Formulas (I) and (II) and which is alkaline, thereby selectively etching the metal selected from titanium, niobium, tungsten, molybdenum, ruthenium, rhodium, arsenic, aluminum and gallium, the oxide of the metal, the nitride of the metal, silicon nitride, hafnium nitride, tantalum nitride, or the alloy of these metals,

[Chemical Formula 1]

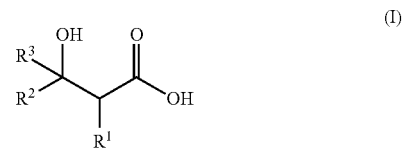

wherein $R^1$ to $R^3$ may be identical to or different from one another, and are —$R^a$, —$OR^b$, —$OOR^c$, —$COOR^d$, —$COOOR^e$, —$CH_2COOR^f$, —$CH_2COOOR^g$, —$CR^hO$ or —$CH_2CHCH_3$ where $R^a$ to $R^h$ may be identical to or different from one another, and are hydrogen, a C1 to C10 saturated aliphatic group, a C1 to C10 unsaturated aliphatic group, or an aryl group, and

[Chemical Formula 2]

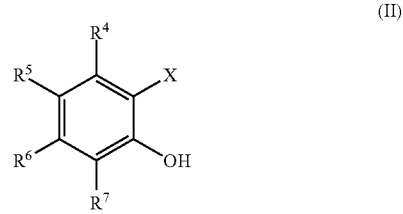

wherein $R^4$ to $R^7$ may be identical to or different from one another, and are —$R^i$, —$OR^j$, —$OOR^k$, —$COOR^l$, —$COOOR^m$, —$CH_2COOR^n$, —$CH_2COOOR^o$, —$CR^pO$, —$CH_2CHCH_3$, —CN, —NC, —$NO_2$, —F, —Cl, —Br, —I, or —$SO_2R^q$ where $R^i$ to $R^q$ may be identical to or different from one another, and are hydrogen, a C1 to C10 saturated aliphatic group, a C1 to C10 unsaturated aliphatic group, or an aryl group, and X is —OH, —COOH or —COOOH.

Furthermore, the present invention relates to an etching solution for a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, provided on an underlying base material selected from glass, silicon, copper and nickel, the etching solution consisting essentially of at least one complexing agent selected from compounds shown by Formulas (I) and (II)

[Chemical Formula 3]

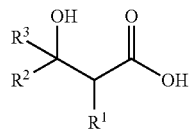

(I)

wherein $R^1$ to $R^3$ may be identical to or different from one another, and are —$R^a$, —$OR^b$, —$OOR^c$, —$COOR^d$, —$COOOR^e$, —$CH_2COOR^f$, —$CH_2COOOR^g$, —$CR^hO$ or —$CH_2CHCH_3$ where $R^a$ to $R^h$ may be identical to or different from one another, and are hydrogen, a C1 to C10 saturated aliphatic group, a C1 to C10 unsaturated aliphatic group, or an aryl group, and

[Chemical Formula 4]

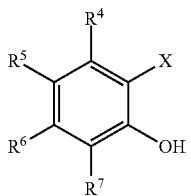

(II)

wherein $R^4$ to $R^7$ may be identical to or different from one another, and are —$R^i$, —$OR^j$, —$OOR^k$, —$COOR^l$, —$COOOR^m$, —$CH_2COOR^n$, —$CH_2COOOR^o$, —$CR^pO$, —$CH_2CHCH_3$, —$CN$, —$NC$, —$NO_2$, —$F$, —$Cl$, —$Br$, —$I$, or —$SO_2R^q$ where $R^i$ to $R^q$ may be identical to or different from one another, and are hydrogen, a C1 to C10 saturated aliphatic group, a C1 to C10 unsaturated aliphatic group, or an aryl group, and X is —OH, —COOH or —COOOH, wherein the etching solution is alkaline.

Advantage of the Invention

According to the present invention, a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals can be etched at practical speed in preference to the underlying base material selected from glass, silicon, copper and nickel.

Furthermore, the present invention can be utilized not only for the above-described etching but also for recycling of the underlying base material selected from glass, silicon, copper and nickel, or for recovery of the above-described metal, oxide of the metal, nitride of the metal, silicon nitride, hafnium nitride, tantalum nitride, or alloy of these metals.

MODE FOR CARRYING OUT THE INVENTION

Figure 1:
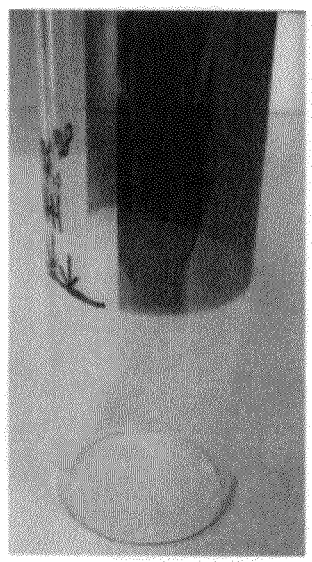
FIG. 1 shows a photo of the appearance of a sample which was etched under etching conditions of 80° C. and 30 seconds by using the etching solution of Example 6 in Test Example 1.

The method for selectively etching a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals according to the present invention (hereinafter, simply referred to as "the method of the present invention") is carried out by bringing a layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, the layer being provided on an underlying base material selected from glass, silicon, copper and nickel, into contact with an etching solution which consists essentially of at least one complexing agent selected from compounds shown by Formulas (I) and (II) and which is alkaline.

[Chemical Formula 5]

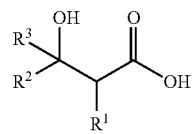

(I)

[Chemical Formula 6]

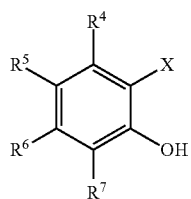

(II)

Additionally, in the present specification, "consisting (consist) essentially of" means that any substances which are other than the substance referred to by "consisting (consist) essentially of" and which influence the effects of the invention should be excluded (in other words, any substances which do not influence the effects of the invention can be included), and preferably means that any substances which are other than the substance referred to by "consisting (consist) essentially of" are not at all included (in other words, only the substance referred to by "consisting (consist) essentially of" is included).

As to the compound shown by Formula (I) among complexing agents used in the method of the present invention, $R^1$ to $R^3$ may be identical to or different from one another, and are —$R^a$, —$OR^b$, —$OOR^b$, —$COOR^d$, —$COOOR^e$, —$CH_2COOR^f$, —$CH_2COOOR^g$, —$CR^hO$ or —$CH_2CHCH_3$ (where $R^a$ to $R^h$ may be identical to or different from one another, and are hydrogen, a C1 to C10 saturated aliphatic group, a C1 to C10 unsaturated aliphatic group, or an aryl group). $R^1$ to $R^3$ are preferably —H, —OH, —COOH or —$CH_2COOH$.

As specific examples of the compound shown by Formula (I), 3-hydroxypropionic acid, tartaric acid, citric acid, malic acid, malonic acid, galacturonic acid, galactaric acid, gluconic acid, hydroxybutyric acid, 2,2-bis(hydroxymethyl)butyric acid, hydroxypivalic acid, and β-hydroxyisovaleric acid can be mentioned. Among them, tartaric acid or citric acid is preferable. In addition, the compound shown by Formula (I) also includes those which are in a form of an alkali metal salt (e.g. a lithium salt, sodium salt or potassium salt) or an ammonium salt and which exhibit the same behaviors as the above-described compounds in the etching solution.

As to the compound shown by Formula (II) among complexing agents used in the method of the present invention, $R^4$ to $R^7$ may be identical to or different from one another, and are —$R^i$, —$OR^j$, —$OOR^k$, —$COOR^l$, —$COOOR^m$, —$CH_2COOR^n$, —$CH_2COOOR^d$, —$CR^pO$, —$CH_2CHCH_3$, —CN, —NC, —$NO_2$, —F, —Cl, —Br, —I, or —$SO_2R^q$ (where $R^i$ to $R^q$ may be identical to or different from one another and are hydrogen, a C1 to C10 saturated aliphatic group, a C1 to C10 unsaturated aliphatic group, or an aryl group). $R^4$ to $R^7$ are preferably —H, —COOH, or —$CH_2COOH$.

Furthermore, X in the compound shown by Formula (II) is —OH, —COOH or —COOOH, and is preferably —OH or —COOH.

As specific examples of the compound shown by Formula (II), protocatechuic acid, ethyl protocatechuate, salicylic acid, 2,3-dihydroxybenzoic acid, 5-chlorosalicylic acid, cresotinic acid, resorcylic acid, naphthoic acid, 3,5-dihydroxy-2-naphthoic acid, 1,4-dihydroxy-2-naphthoic acid, 1-hydroxy-2-naphthoic acid, 2,6-dihydroxy-4-methylbenzoic acid, 2,5-dihydroxyterephthalic acid, methylene disalicylic acid, nitrosalicylic acid, 2,4,6-trihydroxybenzoic acid, 5-sulfosalicylic acid, Mordant Blue 1, chrome yellow, 4-tert-butylcatechol, 4-methylcatechol, catechol, bromocatechol, chlorocatechol, iodocatechol, fluorocatechol, nitrocatechol, cyanocatechol, alizarin, esculetin, gallic acid, ethyl gallate, and 3,4-dihydroxybenzaldehyde can be mentioned. Among them, protocatechuic acid or salicylic acid is preferable. In addition, the compound shown by Formula (II) also includes those which are in a form of an alkali metal salt (e.g. a lithium salt, sodium salt or potassium salt) or an ammonium salt and which exhibit the same behaviors as the above-described compounds in the etching solution.

The content of the above-described complexing agents in the etching solution is 0.001 mol/L or more, preferably 0.1 to 1 mol/L.

The pH of the etching solution used in the method of the present invention is not particularly limited as long as the etching solution is alkaline. However, since the higher the pH of the etching solution is, the higher the etching rate becomes, the pH of the etching solution may be adjusted to preferably 9 or higher, more preferably 10 to 14, particularly preferably 11 to 14, more particularly preferably 12 to 14. The method for making the etching solution alkaline is not particularly limited, and an alkaline material such as sodium hydroxide or potassium hydroxide may be used.

It is preferable that the etching solution used for the method of the present invention further contains an oxidizing agent. By having such an oxidizing agent contained in the etching solution, the etching rate will increase. A type of the oxidizing agent is not particularly limited. However, an oxidizing agent which itself does not corrode the underlying base material is preferable. As examples of such an oxidizing agent which does not corrode the underlying base material, oxygen, hydrogen peroxide, ozone, and percarboxylic acids such as peracetic acid and perbenzoic acid can be mentioned. Among these oxidizing agents, oxygen, hydrogen peroxide and ozone that do not cause any byproduct are preferable. The content of the oxidizing agent in the etching solution is 0.001% to 10% by mass (hereinafter, simply referred to as "%"), preferably 0.1% to 3%. In addition, in cases where the oxidizing agent is a gas such as oxygen or ozone, the gas may be introduced into the etching solution by bubbling and the like of the gas, such that the concentration of the gas in the etching solution falls within the above-mentioned ranges.

Additionally, surfactants generally used in etching solutions may be added to the etching solution used in the method of the present invention in such a manner that the surfactants do not impair the effects of the present invention. By addition of such surfactants, uniformity of etching will be improved. As examples of preferable surfactants, liquid polyethylene glycols such as PEG-200 can be mentioned.

As one preferable example of the etching solution used in the method of the present invention, an etching solution which consists essentially of the above-described complexing agent and which is alkaline can be mentioned.

As another preferable example of the etching solution used in the method of the present invention, an etching solution which consists essentially of the above-described complexing agent and the oxidizing agent and which is alkaline can be mentioned.

Furthermore, as yet another preferable example of the etching solution used in the method of the present invention, an etching solution which consists essentially of the above-described complexing agent, the oxidizing agent, and the surfactant and which is alkaline can be mentioned.

As a preferable composition for the etching solution used in the method of the present invention, a composition containing:
  0.1 to 0.4 mol/L of salicylic acid, or an alkali metal salt or ammonium salt thereof; and/or
  0.1 to 0.4 mol/L of tartaric acid, or an alkali metal salt or ammonium salt thereof; and/or
  0.1 to 0.4 mol/L of citric acid, or an alkali metal salt or ammonium salt thereof; and
  0.3% to 3% of hydrogen peroxide, wherein
  the pH of the composition is 11 or higher, preferably 12 to 14, more preferably 13 to 14,
can be mentioned, and as a more specific composition for the etching solution, a composition, containing:
  0.1 to 0.4 mol/L of sodium salicylate; and
  0.1 to 0.4 mol/L of potassium sodium tartarate (Rochelle salt); and
  0.1 to 0.4 mol/L of torisodium citrate; and
  0.1 to 0.4 mol/L of sodium hydroxide; and
  0.3% to 3% of hydrogen peroxide,
can be mentioned.

As examples of the metal selected from titanium, niobium, tungsten, molybdenum, ruthenium, rhodium, arsenic, aluminum and gallium, the oxide of the metal, the nitride of the metal, silicon nitride, hafnium nitride, tantalum nitride, or the alloy of these metals that is a target to be etched by the method of the present invention, titanium, titanium oxide (II), titanium oxide (III), titanium oxide (IV), titanium nitride, niobium, niobium oxide (II), niobium oxide (III), niobium oxide (IV), niobium oxide (V), niobium nitride, tungsten, molybdenum, ruthenium, rhodium, arsenic, aluminum, aluminum oxide, aluminum nitride, gallium, gallium oxide, gallium nitride, silicon nitride, hafnium nitride, tantalum nitride, or alloys of combinations of one or more of these materials (e.g. niobium titanium, and gallium arsenide) can be mentioned. Among these materials, titanium, titanium oxide (II), titanium oxide (III), titanium oxide (IV), titanium nitride, niobium, niobium oxide (II), niobium oxide (III), niobium oxide (IV), niobium oxide (V), niobium nitride, tantalum nitride, silicon nitride, aluminum, aluminum oxide, aluminum nitride, gallium, gallium oxide, gallium nitride, and an aluminum nitride/aluminum alloy are preferable.

As to the underlying base material used in the method of the present invention, the glass includes silicate glass, quartz, Pyrex, TEMPAX, soda-lime glass, borosilicate glass and the like; the silicon includes monocrystalline silicon, boron-doped silicon, phosphorus-doped silicon, arsenic-doped silicon, antimony-doped silicon, polycrystalline silicon and the like; the copper includes a pure copper metal, copper-containing alloys and the like; and the nickel includes a pure nickel metal, nickel-containing alloys and the like. Furthermore, as for the underlying base material, those including the metal selected from titanium, niobium, tungsten, molybdenum, ruthenium, rhodium, arsenic, aluminum and gallium, the oxide of the metal, the nitride of the metal, silicon nitride, hafnium nitride, tantalum nitride, or the alloy of these metals that is a target to be etched are excluded therefrom. In addition, the shape of the above-described underlying base material is not particularly limited, and any form such as a form of a plate, circle, sphere or combination of these shapes may be adopted.

Moreover, a method for providing on the above-described underlying base material the layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals is not particularly limited, and the layer may be provided thereon by sputtering, vapor deposition, plating or the like which has been generally performed.

A method for bringing the etching solution into contact with the layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, the layer being provided on the above-described underlying base material, is not particularly limited. For example, a method in which the underlying base material where the layer has been provided is immersed in the etching solution; a method in which the etching solution is sprayed onto the layer; and a method in which the etching solution is applied onto the layer can be mentioned.

Also, conditions for etching in the method of the present invention are not particularly limited. However, for example, the temperature of the etching solution is 20° C. to 100° C., preferably 40° C. to 80° C., and the treating time is 0.1 to 200 minutes, preferably 1 to 20 minutes. Additionally, the etching rate in the method of the present invention can be properly controlled by a person skilled in the art based on the concentrations of compounds of Formulas (I) and (II) included in the etching solution, the pH of the etching solution, the temperature of the etching solution and the treating time.

Furthermore, in the method of the present invention, it is preferable that the etching solution be stirred with a stirring bar or by bubbling during etching. By stirring of the etching solution, uniformity of etching may be improved, or redeposition of metals or the like removed by etching onto the underlying base material may not occur.

Because, in the above-described method of the present invention, the layer of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals dissolves, in preference to the underlying base material selected from glass, silicon, copper and nickel in the above-described way, the layer can be selectively removed from the underlying base material.

As preferable examples of combinations of the metals or the like which can be selectively removed by the method of the present invention and the underlying base materials, the following combinations can be mentioned.

| (Underlying base material) | (Metal or the like) |
|---|---|
| Glass | Titanium and/or niobium and/or their oxides and/or nitrides |
| Nickel | Titanium and/or titanium oxide and/or titanium nitride and/or silicon nitride |
| Silicon | Tantalum nitride and/or titanium and/or titanium nitride and/or titanium oxide and/or aluminum and/or aluminum oxide and/or aluminum nitride and/or gallium and/or gallium oxide and/or gallium nitride |
| Copper | Aluminum and/or aluminum nitride and/or gallium and/or gallium nitride |

EXAMPLES

Hereinafter, the present invention will be described in detail with reference to Examples. However, the present invention is not to be considered limited to the Examples.

Example 1

Etching Solution 1.54 g of protocatechuic acid and 1.2 g of sodium hydroxide were dissolved in 100 mL of water. The pH of this etching solution was 14.

Example 2

Etching Solution 1.92 g of citric acid and 1.2 g of sodium hydroxide were dissolved in 100 mL of water. The pH of this etching solution was 14.

Example 3

Etching Solution 1.38 g of salicylic acid, 1 mL of hydrogen peroxide (30%) and 0.8 g of sodium hydroxide were dissolved in 100 mL of water. The pH of this etching solution was 14.

Example 4

Etching Solution 1.50 g of tartaric acid, 1 mL of hydrogen peroxide (30%) and 1.2 g of sodium hydroxide were dissolved in 100 mL of water. The pH of this etching solution was 14.

Example 5

Etching Solution 1.92 g of citric acid, 1 mL of hydrogen peroxide (30%) and 1.6 g of sodium hydroxide were dissolved in 100 mL of water. The pH of this etching solution was 14.

Example 6

Etching Solution 1.38 g of salicylic acid, 1.50 g of tartaric acid, 1.92 g of citric acid, 3 mL of hydrogen peroxide (30%) and 3.6 g of sodium hydroxide were dissolved in 300 mL of water. The pH of this etching solution was 14.

Comparative Example 1

Etching Solution 1 mL of hydrogen peroxide (30%) and 1.2 g of sodium hydroxide were dissolved in 100 mL of water. The pH of this etching solution was 14.

Comparative Example 2

Etching Solution 4.16 g of EDTA.4Na, 1 mL of hydrogen peroxide (30%) and 0.4 g of sodium hydroxide were dissolved in 100 mL of water. The pH of this etching solution was 14.

Comparative Example 3

Etching Solution 1.38 g of salicylic acid, 1 mL of hydrogen peroxide (30%) and 0.4 g of sodium hydroxide were dissolved in 100 mL of water. The pH of this etching solution was 5.

Comparative Example 4

Etching Solution 1.4 g of ethyl maltol and 0.8 g of sodium hydroxide were dissolved in 100 mL of water. The pH of this etching solution was 14.

Comparative Example 5

Etching Solution 1.0 g of acetylacetone and 0.8 g of sodium hydroxide were dissolved in 100 mL of water. The pH of this etching solution was 14.

Comparative Example 6

Etching Solution 0.6 g of glycol and 0.8 g of sodium hydroxide were dissolved in 100 mL of water. The pH of this etching solution was 14.

Comparative Example 7

Etching Solution 1.76 g of ascorbic acid, 1 mL of hydrogen peroxide (30%) and 1.2 g of sodium hydroxide were dissolved in 100 mL of water. The pH of this etching solution was 14.

Comparative Example 8

Etching Solution 1.54 g of protocatechuic acid was dissolved in 100 mL of water. The pH of this etching solution was 5.

Test Example 1

Etching Test

Titanium was deposited onto the inside of each glass cylinder at a thickness of 100 nm by sputtering, and the resulting glass cylinders were used as samples. The samples were each immersed in the etching solutions prepared in Examples 1 to 6 and Comparative Examples 1 to 8 under the conditions described in Table 1, while stirring the etching solutions with stirring bars, thereby carrying out the etching test. Appearances of the samples after the etching test were evaluated based on the following evaluation criteria. The results are also shown in Table 1. Additionally, a photo of appearance of a sample which was etched under the conditions of 80° C. and 30 seconds by using the etching solution of Example 6 is shown in FIG. 1.

<Evaluation Criteria on Titanium Dissolution>

| (Evaluation) | (Contents) |
|---|---|
| ◉ | Titanium was completely dissolved. |
| ○ | Most of titanium was dissolved. |
| Δ | Most of titanium was not dissolved. |
| X | No titanium was dissolved. |

<Evaluation Criteria on Glass Dissolution>

| (Evaluation) | (Contents) |
|---|---|
| + | Glass was not dissolved. |
| − | Glass was dissolved. |

TABLE 1

| Etching solution | Etching conditions | Titanium dissolution | Glass dissolution |
|---|---|---|---|
| Example 1 | 80° C., 60 min. | ◉ | + |
| Example 2 | 80° C., 60 min. | ○ | + |
| Example 3 | 40° C., 30 min. | ◉ | + |
| Example 3 | 60° C., 5 min. | ◉ | + |
| Example 3 | 80° C., 1 min. | ◉ | + |

TABLE 1-continued

| Etching solution | Etching conditions | Titanium dissolution | Glass dissolution |
|---|---|---|---|
| Example 4 | 80° C., 1 min. | ◉ | + |
| Example 5 | 80° C., 10 sec. | ◉ | + |
| Example 6 | 60° C., 10 min. | ◉ | + |
| Example 6 | 80° C., 20 sec. | ◉ | + |
| Example 6 | 80° C., 30 sec. | ◉ | + |
| Comparative Example 1 | 80° C., 10 min. | ◉ | + |
| Comparative Example 2 | 80° C., 2 min. | ◉ | + |
| Comparative Example 3 | 80° C., 60 min. | Δ | + |
| Comparative Example 4 | 80° C., 60 min. | X | + |
| Comparative Example 5 | 80° C., 60 min. | X | + |
| Comparative Example 6 | 80° C., 60 min. | Δ | + |
| Comparative Example 7 | 80° C., 60 min. | X | + |
| Comparative Example 8 | 80° C., 120 min. | X | + |

From the above results, it was revealed that, in cases where no hydrogen peroxide but only a complexing agent was added to the etching solutions of the present invention, protocatechuic acid was the best. Also, it was revealed that, when complexing agents and hydrogen peroxide were combined, the etching rate was improved, and became faster than cases where EDTA was used. Moreover, it was revealed that a higher pH was required for etching. Furthermore, it was revealed that, while etching was completely or almost impossible with general diols among 1,2-diols, 1,2-benzenediols included in Formula (II) were effective. Further, it was revealed that etching was completely impossible with β-diketones and α-hydroxyketones that are general complexing agents for titanium. In addition, it was revealed that etching was completely impossible with complexing agents having reducing power.

Test Example 2

Etching Test

Titanium oxide, titanium, silicon nitride, titanium nitride, silicon nitride and titanium nitride were deposited in that order at 10 nm, 70 nm, 45 nm, 85 nm, 80 nm and 10 nm, respectively, by sputtering, on each of hairline-finished brass rings, the both sides of which are nickel-plated, and these brass rings were used as samples. The samples were each immersed in the etching solutions prepared in Examples 1 and 3-6 and Comparative Examples 1-3 and 6-8 under the conditions described in Table 2, while stirring the etching solutions with stirring bars, thereby carrying out the etching test. Appearances of the samples after the etching test were evaluated based on the following evaluation criteria. The results are also shown in Table 2. Additionally, a sample which was etched under the conditions of 80° C. and 5 minutes by using the etching solution of Example 6 was subjected to an analysis with an electron probe microanalyzer (EPMA).

<Evaluation Criteria on Dissolution of Titanium Oxide, Titanium, Silicon Nitride and Titanium Nitride>

| (Evaluation) | (Contents) |
|---|---|
| ◉ | Titanium oxide, titanium, silicon nitride, and titanium nitride were completely dissolved. |
| ○ | Most of titanium oxide, titanium, silicon nitride and titanium nitride were dissolved. |
| Δ | Most of titanium oxide, titanium, silicon nitride and titanium nitride were not dissolved. |
| X | No titanium oxide, titanium, silicon nitride and titanium nitride were dissolved. |

<Evaluation Criteria on Nickel Dissolution>

| (Evaluation) | (Contents) |
|---|---|
| + | Nickel was not dissolved. |
| − | Nickel was dissolved. |

TABLE 2

| Etching solution | Etching conditions | Dissolution of titanium oxide, etc. | Nickel dissolution |
|---|---|---|---|
| Example 1 | 80° C., 60 min. | ◉ | + |
| Example 3 | 60° C., 30 min. | ◉ | + |
| Example 3 | 80° C., 5 min. | ◉ | + |
| Example 4 | 80° C., 4 min. | ◉ | + |
| Example 5 | 80° C., 2 min. | ◉ | + |
| Example 6 | 60° C., 30 min. | ◉ | + |
| Example 6 | 80° C., 5 min. | ◉ | + |
| Example 6 | 80° C., 2 min. | ◉ | + |
| Comparative Example 1 | 80° C., 60 min. | X | + |
| Comparative Example 2 | 80° C., 40 min. | ◉ | − |
| Comparative Example 3 | 80° C., 60 min. | X | + |
| Comparative Example 6 | 80° C., 60 min. | Δ | + |
| Comparative Example 7 | 80° C., 60 min. | X | + |
| Comparative Example 8 | 80° C., 120 min. | X | + |

From the above results, it was revealed that, as titanium oxide, titanium, silicon nitride and titanium nitride were dissolved by the etching solutions of the present invention in preference to the underlying base material of nickel, these materials could be selectively removed from the underlying base material of nickel. Furthermore, as results of the EPMA analysis, before and after etching, 64.0 mol % changed to 74.2 mol % for nickel; 6.0 mol % changed to 16.4 mol % for copper; 3.4 mol % changed to 9.4 mol % for zinc; 11.6 mol % changed to 0 mol % for titanium; and 15.0 mol % changed to 0 mol % for silicon, and thus, it was revealed that all titanium and silicon were removed by etching.

Test Example 3

Etching Test

Tantalum nitride was deposited on one side of each silicon wafer at 50 μm by sputtering, and the silicon wafers were used as samples. The samples were each immersed in the etching solutions prepared in Examples 1 and 3-6 and Comparative Examples 1-3 under the conditions described in Table 3, while stirring the etching solutions with stirring bars, thereby carrying out the etching test. Appearances of the samples after the etching test were evaluated based on the following evaluation criteria. The results are also shown in Table 3.

<Evaluation Criteria on Dissolution of Tantalum Nitride>

| (Evaluation) | (Contents) |
|---|---|
| ◉ | Tantalum nitride was completely dissolved. |
| ○ | Most of tantalum nitride was dissolved. |
| Δ | Most of tantalum nitride was not dissolved. |
| X | No tantalum nitride was dissolved. |

<Evaluation Criteria on Silicon Dissolution>

| (Evaluation) | (Contents) |
|---|---|
| + | Silicon was not dissolved. |
| − | Silicon was dissolved. |

TABLE 3

| Etching solution | Etching conditions | Dissolution of tantalum nitride | Silicon dissolution |
|---|---|---|---|
| Example 3 | 80° C., 60 min. | ◎ | + |
| Example 4 | 80° C., 60 min. | ◎ | + |
| Example 5 | 80° C., 40 min. | ◎ | + |
| Example 6 | 80° C., 40 min. | ◎ | + |
| Comparative Example 1 | 80° C., 60 min. | X | + |
| Comparative Example 2 | 80° C., 30 min. | ◎ | − |
| Comparative Example 3 | 80° C., 60 min. | X | + |

Based on the above results, it was revealed that, as tantalum nitride was dissolved by the etching solutions of the present invention in preference to the underlying base material of silicon, this material could be selectively removed from the underlying base material of silicon.

Test Example 4

Etching Test

Figure 2:
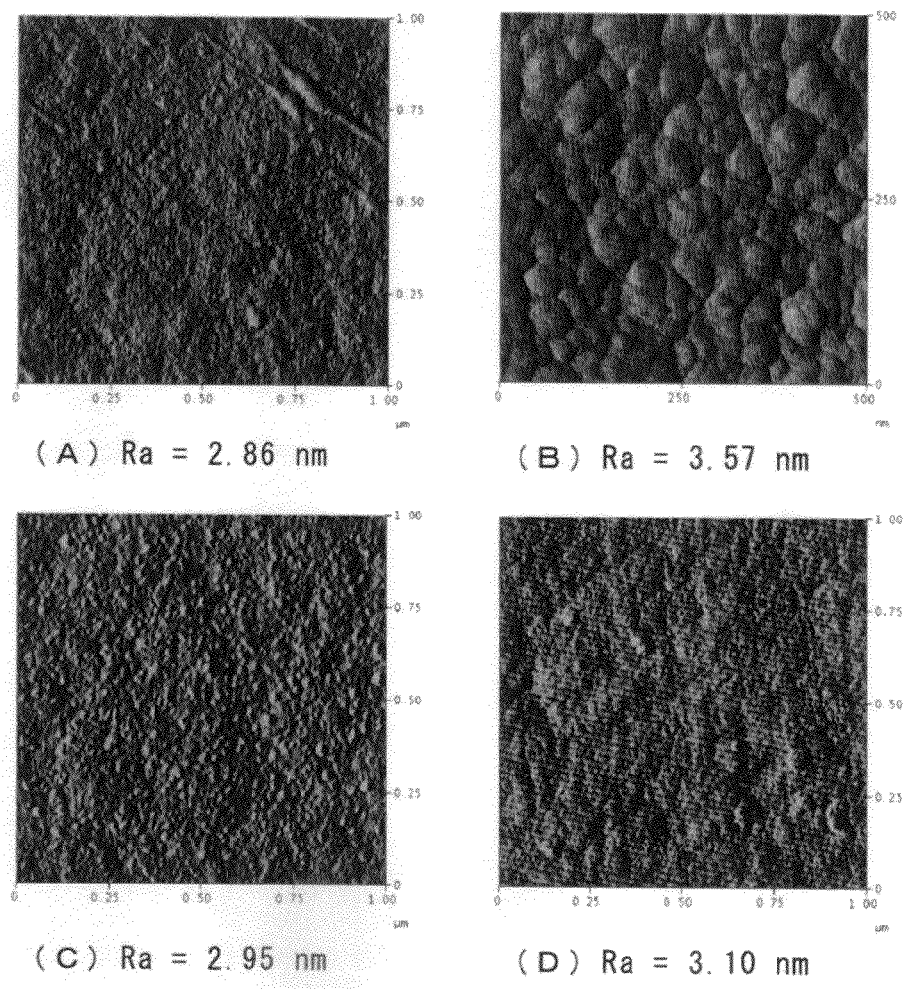
FIG. 2 shows SPM photos and Ra values of samples which were etched under etching conditions of 80° C. and 5 minutes by using the etching solution of Example 6 in Test Example 4. (In this figure, (A) refers to the surface of Sample A; (B) refers to the surface of Sample B; (C) refers to the surface of Sample B which was subjected to etching; and (D) refers to the surface of Sample A which was subjected to etching.)

A brass plate, one side of which was nickel-plated, was designated as Sample A. Additionally, that obtained by depositing titanium oxide, titanium, silicon nitride, titanium nitride, silicon nitride and titanium nitride in that order at 10 nm, 70 nm, 45 nm, 85 nm, 80 nm and 10 nm, respectively, by sputtering, on the above brass plate was designated as Sample B. Each of Samples A and B was immersed in the etching solution prepared in Example 6 under the conditions of 80° C. and 5 minutes, while stirring the etching solution with a stirring bar, thereby carrying out the etching test. With respect to the samples before and after the etching test, the surface shape and the surface roughness (Ra values) were observed with a scanning probe microscope (SPM). The results are shown in FIG. 2.

From the results of the SPM observation and the Ra measurement, it was revealed that, as titanium oxide, titanium, silicon nitride, and titanium nitride were dissolved by the etching solution of the present invention in preference to the underlying base material of nickel, these materials could be selectively removed from the underlying base material of nickel.

Test Example 5

Etching Test

Figure 3:
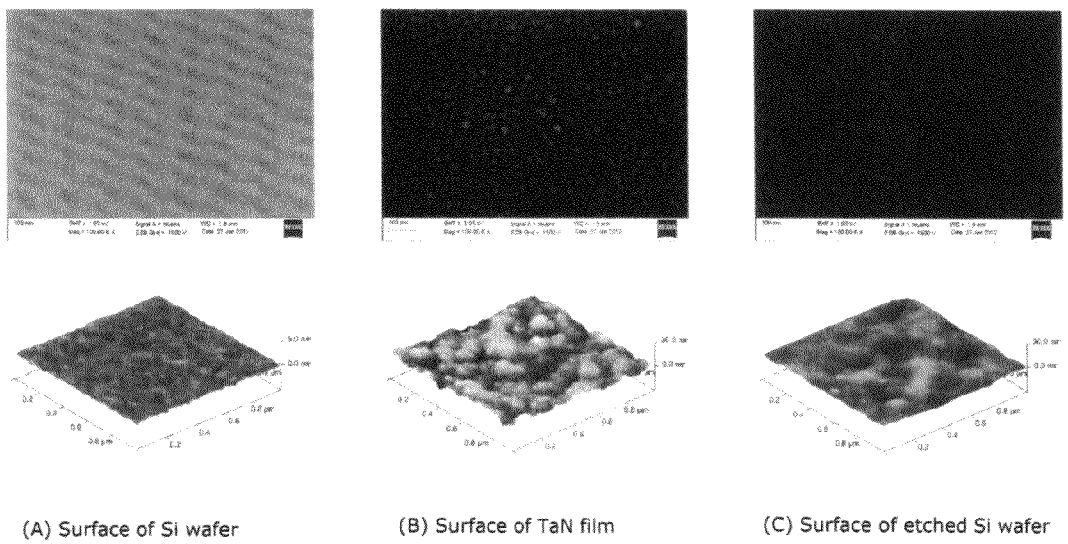
FIG. 3 shows SEM photos (upside) and SPM photos (downside) of samples which were etched under etching conditions of 80° C. and 40 minutes by using the etching solution of Example 6 in Test Example 5. (In this figure, (A) refers to the surface of Sample A; (B) refers to the surface of Sample B; and (C) refers to the surface of Sample B which was subjected to etching.)

A product obtained through deposition of tantalum nitride on one side of a silicon wafer (Sample A) at 50 μm by sputtering was designated as Sample B. Sample B was immersed in the etching solution prepared in Example 6 under the conditions of 80° C. and 40 minutes, while stirring the etching solution with a stirring bar, thereby carrying out the etching test, and the resulting silicon wafer was designated as Sample C. These samples were subjected to observations with a scanning electron microscope (SEM) and an SPM. The results are shown in FIG. 3.

From the results of the SEM and SPM observations, it was revealed that, as tantalum nitride was dissolved by the etching solution of the present invention in preference to the underlying base material of silicon, the material could be selectively removed from the underlying base material of silicon.

Test Example 6

Etching Test

Figure 4:
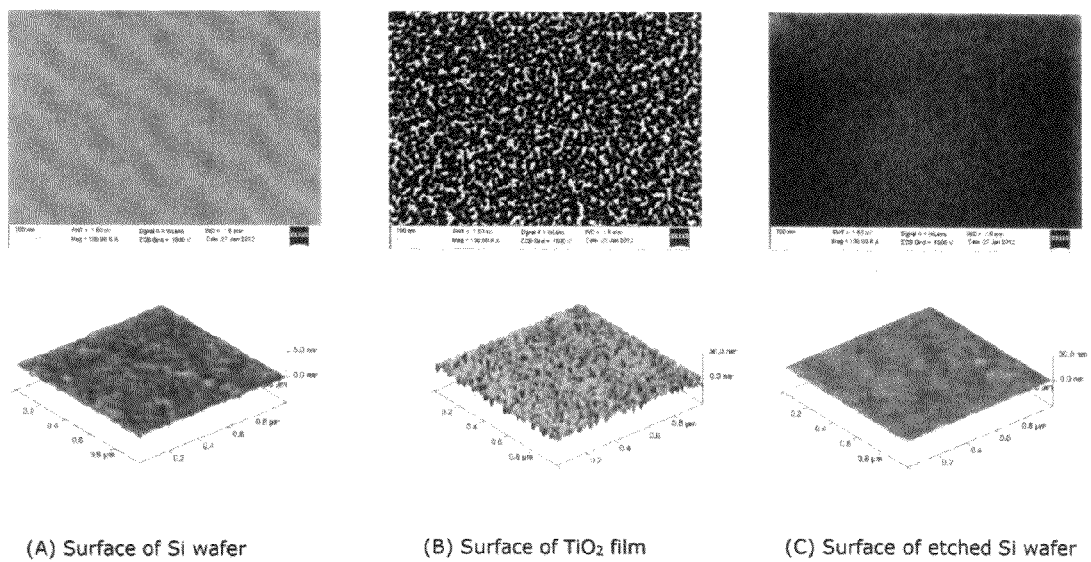
FIG. 4 shows SEM photos (upside) and SPM photos (downside) of samples which were etched under etching conditions of 80° C. and 25 seconds by using the etching solution of Example 6 in Test Example 6. (In this figure, (A) refers to the surface of Sample A; (B) refers to the surface of Sample B; and (C) refers to the surface of Sample B which was subjected to etching.)

A product obtained through deposition of titanium nitride and titanium oxide in that order on one side of a silicon wafer (Sample A) at 50 μm each by sputtering was designated as Sample B. Sample B was immersed in the etching solution prepared in Example 6 under the conditions of 80° C. and 25 seconds, while stirring the etching solution with a stirring bar, thereby carrying out the etching test, and the resulting silicon wafer was designated as Sample C. These samples were subjected to observations with a SEM and an SPM. The results are shown in FIG. 4.

From the results of the SEM and SPM observations, it was revealed that, as titanium nitride and titanium oxide were dissolved by the etching solution of the present invention in preference to the underlying base material of silicon, these materials could be selectively removed from the underlying base material of silicon.

Test Example 7

Selection of Etching Conditions

An etching solution which included 0.334 mol/L of salicylic acid, 0.333 mol/L of tartaric acid, 0.333 mol/L of citric acid, and 1 mol/L of hydrogen peroxide, and the pH of which was adjusted to 11 or higher with sodium hydroxide was used as a basic composition, and this basic composition was diluted as described in Table 4 below to prepare the etching solutions. The same sample as that used in Test Example 1 (glass cylinder) and the same sample as that used in Test Example 2 (ring) were subjected to etching under the conditions described in Table 4 with these etching solutions, while stirring the etching solutions with stirring bars. In addition, the etching-termination time corresponds to a time required for removal of each sputtering film which was visually confirmed.

TABLE 4

| Concentration of complexing agent (mol/L) | Concentration of oxidizing agent (mol/L) | pH | Bath temperature (° C.) | Glass cylinder (titanium) etching-termination time (s) | Ring (titanium oxide, etc.) etching-termination time (s) |
|---|---|---|---|---|---|
| 0.01 | 0.1 | 11 or higher | 50 | 1500 | 7200 |
| 0.1 | 0.1 | 11 or higher | 50 | 270 | 900 |
| 0.5 | 0.5 | 11 or higher | 50 | 15 | 240 |
| 1.0 | 1.0 | 11 or higher | 50 | 10 | 180 |
| 1.0 | 1.0 | 11 or higher | 35 | 50 | — |
| 1.0 | 1.0 | 11 or higher | 25 | 150 | — |
| 0.5 | 0.5 | 11 or higher | 25 | 600 | — |

—: untested

Based on the above results, correlations between the concentration of complexing agent or the bath temperature and the etching rate were confirmed. It was revealed that, as the concentration of complexing agent and the bath temperature were increased, the etching rate became higher.

Test Example 8

Elemental Analysis on an Etching Solution Used

By using the etching solution of Example 6, the same sample as that used in Test Example 1 (glass cylinder) was etched at 80° C. for 30 seconds, the same sample as that used in Test Example 2 (ring) was etched at 80° C. for 5 minutes, and the same sample as that used in Test Example 6 (the product obtained by depositing titanium nitride and titanium oxide on a silicon wafer (Sample B)) was etched at 80° C. for 25 seconds. The etching solutions after the etching treatments were subjected to an elemental analysis with an ICP-AES. Additionally, for comparison, same samples were each etched by using the etching solution of Comparative Example 2, and the etching solutions remained after the etching treatments were also subjected to the elemental analysis. The results of the analysis are shown in Table 5.

TABLE 5

|  | Example 6 | Comparative Example 2 |
| --- | --- | --- |
| Silicon | 36.1 mg/L | 23.5 mg/L |
| Titanium | About 5 mg/L | About 1 mg/L |
| Nickel | Not detected | 8.5 mg/L |

From the above results, it was revealed that titanium was dissolved by the etching solution of the present invention in preference to nickel and silicon, as compared with the conventional etching solution. As to the etching solution of the present invention, titanium was 5 mg/L while silicon was 36.1 mg/L and nickel was not detected. On the other hand, as to the conventional etching solution, titanium was 1 mg/L while silicon and nickel were 23.5 mg/L and 8.5 mg/L, respectively. It was considered that, in comparison with the quantity of titanium in the conventional etching solution, the excessive silicon was dissolved from the silicon wafer substrate while nickel was dissolved from the nickel-plated substrate. It was revealed that the complexing agent used in the present invention exhibited selectivity in dissolution of titanium and the nitride.

Test Example 9

Measurement of the Etching Rate (1) Measurement of the Etching Rate of Titanium

Titanium was deposited on each glass at 100 nm by sputtering, the resulting samples were each immersed in the etching solutions described in Table 6 which had been heated to 80° C., while stirring the etching solutions with stirring bars, and each etching rate was calculated from the etching time, the quantity of titanium dissolved therein and the area which came into contact with the etching solution. The results are shown in Table 6.

TABLE 6

| Etching solution | Etching rate (nm/s) |
| --- | --- |
| Example 1 | 0.028 |
| Example 2 | 0.024 |
| Example 3 | 1.667 |
| Example 4 | 1.667 |
| Example 5 | 10.00 |

TABLE 6-continued

| Etching solution | Etching rate (nm/s) |
| --- | --- |
| Example 6 | 5.000 |
| Comparative Example 1 | 0.167 |
| Comparative Example 2 | 0.833 |

(2) Measurement of the Etching Rate of Titanium Oxide/Titanium Nitride

Titanium oxide and titanium nitride were deposited in that order on each silicon wafer at 50 nm each by sputtering, the resulting samples were each immersed in the etching solutions described in Table 7 which had been heated to 80° C., while stirring the etching solutions with stirring bars, and each etching rate was calculated from the etching time, the quantity of titanium oxide/titanium nitride dissolved therein and the area which came into contact with the etching solution. The results are shown in Table 7.

TABLE 7

| Etching solution | Etching rate (nm/s) |
| --- | --- |
| Example 3 | 5.000 |
| Example 4 | 0.833 |
| Example 5 | 3.333 |
| Example 6 | 4.000 |
| Comparative Example 2 | 0.833 |

(3) Measurement of the Etching Rate of Niobium

Niobium was deposited on each glass at 200 nm by sputtering, the resulting samples were each immersed in the etching solutions described in Table 8 which had been heated to 80° C., while stirring the etching solutions with stirring bars, and each etching rate was calculated from the etching time, the quantity of niobium dissolved therein and the area which came into contact with the etching solution. The results are shown in Table 8.

TABLE 8

| Etching solution | Etching rate (nm/s) |
| --- | --- |
| Example 3 | 1.667 |
| Example 4 | 1.667 |
| Example 5 | 1.667 |
| Example 6 | 1.667 |
| Comparative Example 2 | 0.667 |

(4) Measurement of the Etching Rate of Tantalum Nitride

Tantalum nitride was deposited on each silicon wafer at 50 nm by sputtering, the resulting samples were each immersed in the etching solutions described in Table 9 which had been heated to 80° C., while stirring the etching solutions with stirring bars, and each etching rate was calculated from the etching time, the quantity of tantalum nitride dissolved therein and the area which came into contact with the etching solution. The results are shown in Table 9.

TABLE 9

| Etching solution | Etching rate (nm/s) |
| --- | --- |
| Example 3 | 0.014 |
| Example 4 | 0.014 |
| Example 5 | 0.021 |
| Example 6 | 0.021 |
| Comparative Example 2 | 0.028 |

Test Example 10

Measurement of the Etching Rate (1) Measurement of the Etching Rate of Glass

Glass plates were each immersed in the etching solutions described in Table 10 which had been heated to 80° C., while stirring the etching solutions with stirring bars, and each etching rate was calculated from the etching time, the quantity of glass dissolved therein and the weight difference of the glass plate between before and after etching with respect to the area of the glass plate which came into contact with the etching solution. The results are shown in Table 10.

TABLE 10

| Etching solution | Etching rate (nm/s) |
| --- | --- |
| Example 6 | 0.002 |
| Comparative Example 2 | 0.007 |

(2) Measurement of the Etching Rate of Silicon

Silicon wafers were each immersed in the etching solutions described in Table 11 which had been heated to 80° C., while stirring the etching solutions with stirring bars, and each etching rate was calculated from the etching time, the quantity of silicon dissolved therein and the weight difference of the silicon wafer between before and after etching with respect to the area of the silicon wafer which came into contact with the etching solution. The results are shown in Table 11.

TABLE 11

| Etching solution | Etching rate (nm/s) |
| --- | --- |
| Example 6 | 0.007 |
| Comparative Example 2 | 0.418 |

(3) Measurement of the Etching Rate of Nickel

Brass plates (front sides of which were nickel-plated) were each immersed in the etching solutions described in Table 12 which had been heated to 80° C., while stirring the etching solutions with stirring bars, and each etching rate was calculated from the etching time, the quantity of nickel dissolved therein and the weight difference of the brass plate having a nickel-plated front side between before and after etching with respect to the area of the brass plate which came into contact with the etching solution. The results are shown in Table 12.

TABLE 12

| Etching solution | Etching rate (nm/s) |
| --- | --- |
| Example 3 | 0.0060 |
| Example 4 | 0.0003 |
| Example 5 | 0.0035 |
| Example 6 | 0.0077 |
| Comparative Example 2 | 0.2454 |

From the above results, it was shown that, as to the etching solutions of the present invention, the etching rates of glass, silicon and nickel which served as underlying base materials were slower than the etching rates of titanium, titanium oxide, titanium nitride, niobium and tantalum nitride. Therefore, it was shown that titanium, titanium oxide, titanium nitride, niobium and tantalum nitride were dissolved by the etching solutions of the present invention in preference to the underlying base materials. On the other hand, it was shown that the etching solutions using EDTA exhibited quite faster etching rates of the underlying base materials than the etching solutions of the present invention.

Test Example 11

Etching Test

When a strip of a gallium arsenide wafer was immersed in the etching solution prepared in Example 6 which had been heated to 80° C., the strip of gallium arsenide was dissolved therein soon. From this result, it was revealed that arsenic, gallium, and gallium arsenide could be selectively etched by the etching solution of the present invention in the same manner as titanium or the like.

Test Example 12

Etching Test

When a test piece of tungsten, molybdenum, ruthenium or rhodium was immersed in the etching solution prepared in Example 6 that had been heated to 80° C., the test piece was dissolved soon. From the results, it was revealed that tungsten, molybdenum, ruthenium or rhodium could be selectively etched by the etching solution of the present invention in the same manner as titanium or the like.

Test Example 13

Recycling Test

Titanium oxide, titanium, silicon nitride, titanium nitride, silicon nitride and titanium nitride were deposited in that order at 10 nm, 70 nm, 45 nm, 85 nm, 80 nm and 10 nm, respectively, on a hairline-finished brass ring, the both sides of which were nickel-plated, by sputtering, and the resulting ring was used as a sample. The sample was immersed in the etching solution prepared in Example 6 that had been heated to 80° C., for 5 minutes, and the titanium oxide, titanium, silicon nitride and titanium nitride deposited by sputtering were completely etched. After that, this sample was dried, and further, the above sputtering was again carried out. Consequently, the same appearance as that of the sample before etching was obtained. This test showed that recycling of samples is possible.

Example 7

Etching Solution 23 g of salicylic acid, 47 g of Rochelle salt, 43 g of sodium citrate, 1 mL of PEG-200, 50 mL of hydrogen peroxide (34%) and 10 g of sodium hydroxide were dissolved in 1,000 mL of water. The pH of this etching solution was 12.7.

Test Example 14

Etching Test

The pH of the etching solutions prepared along with Example 7 were each adjusted to pH values described in Table 13 by using sodium hydroxide or sulfuric acid. The same sample as that used in Test Example 1 (glass cylinder) and the same sample as that used in Test Example 2 (ring) were each immersed in the etching solutions which had been heated to 50° C., and a time required for complete removal of each sputtering film, which was visually confirmed, was measured. The results are shown in Table 13.

TABLE 13

| | Etching time (s) | |
| --- | --- | --- |
| pH | Glass cylinder (titanium) | Ring (titanium oxide, etc.) |
| 7 | 2100 | 4200 |
| 8 | 1200 | 2400 |
| 9 | 1200 | 2100 |
| 10 | 1200 | 2100 |
| 11 | 360 | 1200 |
| 12 | 120 | 540 |
| 13 | 15 | 180 |
| 14 | 10 | 180 |

This test revealed that the higher the pH of the etching solution was, the more the etching rate increased. In particular, the etching rate increased about twice or even higher in each of pH ranges of 11 or higher, 12 or higher, and 13 to 14, compared with a case where the pH is below each pH range.

Example 8

Etching Solution 129 g of sodium citrate, 0.1 mL of PEG-200, and 50 mL of hydrogen peroxide (34%) were dissolved in 1,000 mL of water. The pH of this etching solution was 13.

Test Example 15

Etching Test

An aluminum or copper plate of 5×5×0.1 cm was immersed in the etching solution prepared in Example 8 that had been heated to 50° C., and the etching rate was measured in the same manner as Test Example 10. It was revealed that the etching rate of the aluminum plate was 130 nm/s while the etching rate of the copper plate was 0.142 nm/s.

Test Example 16

Etching Test

When a test piece of aluminum oxide was immersed in the etching solution prepared in Example 8 that had been heated to 60° C., the test piece was dissolved soon. From this result, it was revealed that aluminum oxide could also be selectively etched by the etching solution of the present invention in the same manner as titanium or the like.

Test Example 17

Etching Test

When a test piece obtained through lamination of aluminum nitride and gallium nitride onto a silicon wafer in that order by sputtering was immersed in the etching solution prepared in Example 8 that had been heated to 60° C., the layers of aluminum nitride and gallium nitride were dissolved soon. From this result, it was revealed that aluminum nitride or gallium nitride could also be selectively etched by the etching solution of the present invention in the same manner as titanium or the like.

The principle of etching in the method of the present invention described above is presumed as follows.

(1) A Role of the Complexing Agent:

The selected complexing agent chelates metals on the surface (a) to thereby make it easier for the metals on the surface to receive nucleophilic attacks and (b) to thereby make it easier for generated metal complexes to be dissolved in the etching solution. That is, the ligand of the selected complexing agent selectively chelates metals (e.g. titanium and niobium) that are suited to the shape, orbital alignment and electronic properties of metal atoms subjected to etching, and thus, it becomes possible to etch only specific metals. However, when EDTA or the like which is a generally used complexing agent, are used, such a complexing agent strongly chelates many types of metals, and therefore, the selectivity is low. That is, the complexing agent selected in the present invention serves as one factor which specify the selectivity against metals to be etched.

The complexing capability or selectivity of a complexing agent is determined depending on the coordination number, coordination species [nitrogen (e.g. nitrogen included in amines or nitriles), oxygen (e.g. oxygen included in hydroxyls, carboxylic acids or carbonyls), phosphorus, or sulfur (e.g. sulfur included in mercaptos or thiocarbonyls)], coordination properties, electronic properties, and the distance/alignment of ligand-ligand in case of a higher coordination number. In the present invention, a molecule which has two or three coordinating oxygen atoms separated by three carbons and which has a hydroxyl for one coordination species and a carboxylic acid or benzenediol for the other coordination species is considered optimal. (In case of three coordinating oxygen atoms, another coordination species may also be oxygen-based one, preferably.) For example, when nitrogen is present in coordination species, nickel is also etched although titanium or niobium should be etched, and therefore, such a complexing agent is inconsistent with the purpose of the present invention.

(2) A Role of the Base:

The base makes nucleophilic attacks against chelated metals (e.g. hydroxides).

(3) A Role of the Oxidizing Agent:

When binding with each metal (M) within a metal oxide, metal nitride or metal complex, the oxidizing agent causes oxidative decomposition of bonds with metals, and destroys the lattice or non-lattice bonds.

(e.g. M-O-M→M-O—O-M→2M=O)

In case of metal etching, a metal or metal complex is oxidized.

(e.g. M→Mn$^+$, or ligand-Mn$^-$→ligand-M)

INDUSTRIAL APPLICABILITY

The method of the present invention can be utilized for etching of a metal selected from titanium, niobium, tungsten, molybdenum, ruthenium, rhodium, arsenic, aluminum and gallium, an oxide of the metal, a nitride of the metal, silicon nitride, hafnium nitride, tantalum nitride, or an alloy of these metals, as well as for recycling of the underlying base material or for recovery of the above metal, the oxide of the metal, the nitride of the metal, silicon nitride, hafnium nitride, tantalum nitride, or the alloy of these metals.

The invention claimed is:

1. An etching method, comprising:
    bringing a layer of a metal selected from the group consisting of titanium, niobium, tungsten, molybdenum, ruthenium, rhodium, arsenic, aluminum and gallium, an oxide of the metal, a nitride of the metal, silicon nitride, hafnium nitride, tantalum nitride, and an alloy of these metals, said layer being provided on an underlying base material selected from the group consisting of glass, silicon, copper and nickel, into contact with an etching solution which consists essentially of at least one complexing agent selected from Formulas (I) and (II) and wherein the pH of said etching solution is 11 or higher, thereby selectively etching said metal;

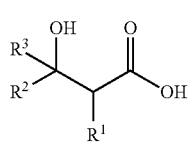
(I)

wherein $R^1$ to $R^3$ may be identical to or different from one another, and are selected from the group consisting of $-R^a$, $-OR^b$, $-OOR^c$, $-COOR^d$, $-COOOR^e$, $-CH_2COOR^f$, $-CH_2COOOR^g$, $-CR^hO$ and $-CH_2CHCH_3$, where $R^a$ to $R^h$ may be identical to or different from one another, and are selected from the group consisting of hydrogen, a C1 to C10 saturated aliphatic group, a C1 to C10 unsaturated aliphatic group, and an aryl group, and

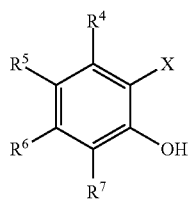
(II)

wherein $R^4$ to $R^7$ may be identical to or different from one another, and are selected from the group consisting of $-R^i$, $-OR^j$, $-OOR^k$, $-COOR^l$, $-COOOR^m$, $-CH_2COOR^n$, $-CH_2COOOR^o$, $-CR^pO$, $-CH_2CHCH_3$, $-CN$, $-NC$, $-NO_2$, $-F$, $-Cl$, $-Br$, $-I$, and $-SO_2R^q$ where $R^i$ to $R^q$ may be identical to or different from one another, and are selected from the group consisting of hydrogen, a C1 to C10 saturated aliphatic group, a C1 to C10 unsaturated aliphatic group, and an aryl group, and X is $-OH$, $-COOH$ or $-COOOH$.

2. The etching method according to claim 1, wherein the pH is from 12 to 14.

3. The etching method according to claim 1, wherein the etching solution further comprises an oxidizing agent.

4. The etching method according to claim 3, wherein the pH is from 12 to 14.

5. An etching solution for a metal,
wherein the metal is selected from the group consisting of titanium, niobium, tungsten, molybdenum, ruthenium, rhodium, arsenic, aluminum and gallium, an oxide of the metal, a nitride of the metal, silicon nitride, hafnium nitride, tantalum nitride, and an alloy of these metals, and said metal is provided on an underlying base material selected from the group consisting of glass, silicon, copper and nickel, said etching solution consisting essentially of at least one complexing agent selected from Formulas (I) and (II)

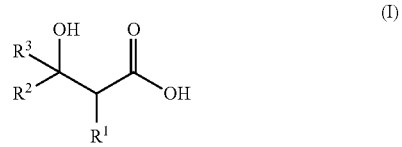
(I)

wherein $R^1$ to $R^3$ may be identical to or different from one another, and are selected from the group consisting of $-R^a$, $-OR^b$, $-OOR^c$, $-COOR^d$, $-COOOR^e$, $-CH_2COOR^f$, $-CH_2COOOR^g$, $-CR^hO$ and $-CH_2CHCH_3$ where $R^a$ to $R^h$ may be identical to or different from one another, and are selected from the group consisting of hydrogen, a C1 to C10 saturated aliphatic group, a C1 to C10 unsaturated aliphatic group, and an aryl group, and

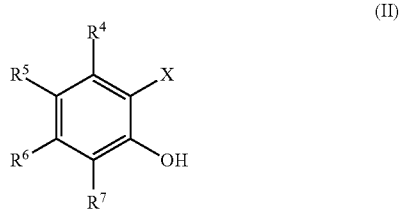
(II)

wherein $R^4$ to $R^7$ may be identical to or different from one another, and are selected from the group consisting of $-R^i$, $-OR^j$, $-OOR^k$, $-COOR^l$, $-COOOR^m$, $-CH_2COOR^n$, $-CH_2COOOR^o$, $-CR^pO$, $-CH_2CHCH_3$, $-CN$, $-NC$, $-NO_2$, $-F$, $-Br$, and $-SO_2R^q$ where $R^i$ to $R^q$ may be identical to or different from one another, and are selected from the group consisting of hydrogen, a C1 to C10 saturated aliphatic group, a C1 to C10 unsaturated aliphatic group, and an aryl group, and X is $-OH$, $-COOH$ or $-COOOH$,
wherein the pH of said etching solution is 11 or higher.

6. The etching solution for metal according to claim 5, wherein the pH is from 12 to 14.

7. The etching solution for a metal according to claim 5, wherein said etching solution further comprises an oxidizing agent.

8. The etching solution for metal according to claim 7, wherein the pH is from 12 to 14.

* * * * *